United States Patent [19]

Terry, Sr.

[11] Patent Number: 4,909,101
[45] Date of Patent: Mar. 20, 1990

[54] CONTINUOUSLY VARIABLE TRANSMISSION

[76] Inventor: Maurice C. Terry, Sr., 13922 SE. 44th St., Bellevue, Wash. 98006

[21] Appl. No.: 195,724

[22] Filed: May 18, 1988

[51] Int. Cl.[4] .......................... F16H 3/44; F16H 57/10
[52] U.S. Cl. ........................................ 475/16; 74/117; 475/297; 475/305
[58] Field of Search ............. 74/117, 118, 123, 750 B, 74/804, 805, 125.5, 793; 464/87, 92

[56] References Cited

U.S. PATENT DOCUMENTS

| | | | |
|---|---|---|---|
| 1,072,622 | 9/1913 | Koechlin | 464/87 X |
| 2,199,051 | 4/1940 | Laub | 74/123 |
| 2,667,089 | 1/1954 | Gregory | 74/793 X |
| 2,830,445 | 4/1958 | Kressin | 464/87 |
| 3,073,173 | 1/1963 | Immel | 74/114 |
| 3,229,549 | 1/1966 | Riedl | 74/117 X |
| 3,359,813 | 12/1967 | Okano | 74/117 |
| 3,722,305 | 3/1973 | Walters et al. | 74/125.5 |
| 3,803,931 | 4/1974 | Bianchini et al. | 74/117 |
| 3,803,932 | 4/1974 | Waddington | 74/117 |
| 3,874,253 | 4/1975 | Waddington | 74/750 B X |
| 4,098,147 | 7/1978 | Waddington | 74/750 B |
| 4,160,393 | 7/1979 | Fukui | 74/750 B |
| 4,181,043 | 1/1980 | Waddington | 74/750 B |
| 4,194,407 | 3/1980 | Gogins | 74/117 |
| 4,277,986 | 7/1981 | Waddington | 74/750 B |
| 4,494,416 | 1/1985 | Evans | 74/125.5 X |
| 4,505,163 | 3/1985 | Falkner | 74/805 |
| 4,557,703 | 12/1985 | Rivin | 464/87 X |
| 4,644,828 | 2/1987 | Kozakae | 74/117 X |

FOREIGN PATENT DOCUMENTS

| | | | |
|---|---|---|---|
| 2520129 | 11/1975 | Fed. Rep. of Germany | 74/793 |
| 2570155 | 3/1986 | France | 74/793 |
| 218491 | 3/1985 | Japan | 74/750 B |
| 465081 | 4/1937 | United Kingdom | 74/117 |

Primary Examiner—Dirk Wright
Attorney, Agent, or Firm—Curtis, Morris & Safford

[57] ABSTRACT

A continuously variable transmission includes a power input driving a sun gear which in turn drives a plurality of planetary gears. Within each planetary gear is mounted an over-rolling clutch. The planet gear is free to rotate about its raceway in one direction and is locked from rotation in the opposite direction. The shaft mountings for each planetary gear are suitably journalled in a carrier ring rotatably mounted within the housing. An internal gear, integrally mounted within the output housing, meshes with the planetary gears and is driven by them. An eccentric system, comprised of two nested eccentrics within the housing and anchored to an axle, controls the degree of oscillation imparted to the planetary gear raceway shafts. The eccentric system is continuously positionable so as to increase the rotation of the input sun gear from a one-to-one ratio up to the maximum designed output. As the eccentricity is increased, the planetary gear system superimposes a pulse drive on the sun gear that exponentially multiplies the drive rotation rate. Thus, the output housing is driven at a greater rate of rotation than the planetary carrier. When the eccentrics are at the zero eccentricity position, the transmission operates as a direct drive with no internal gear motion.

11 Claims, 12 Drawing Sheets

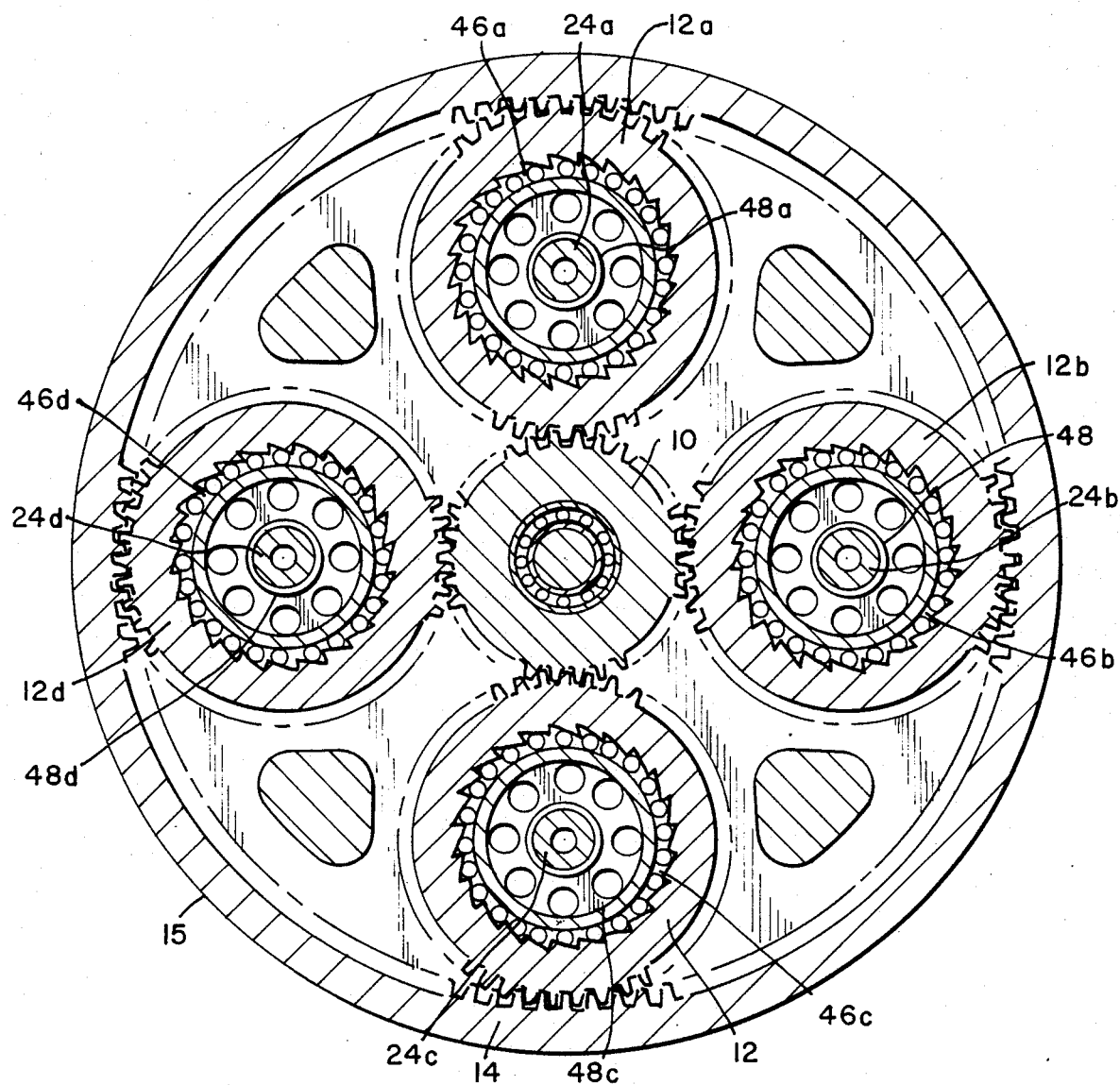
F I G. 5

FIG. 9
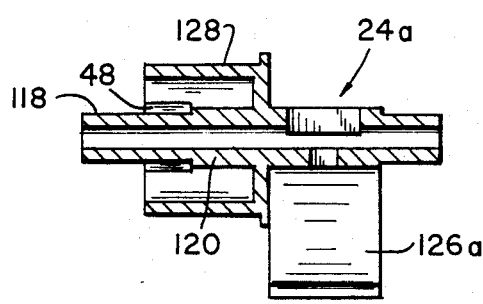
FIG. 10
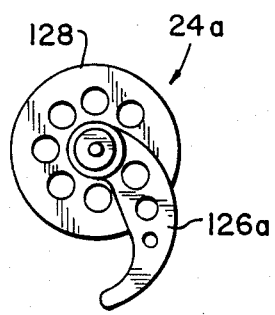
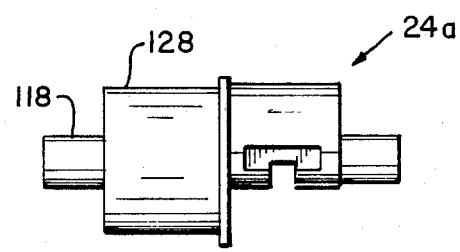
FIG. 11
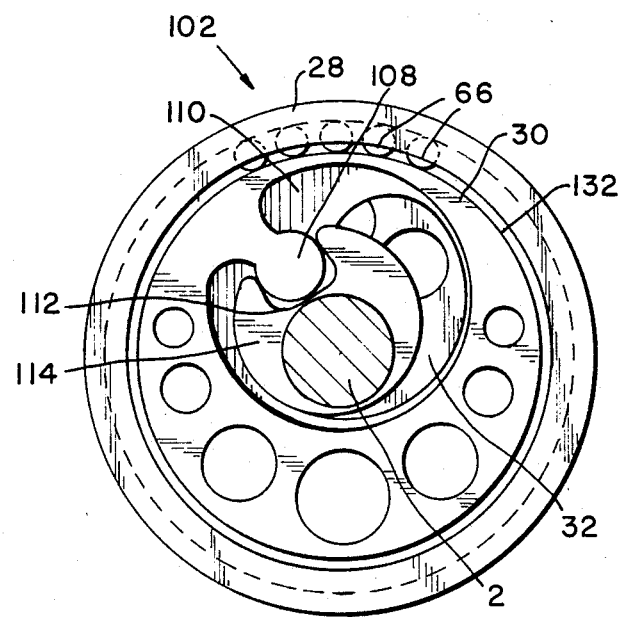
FIG. 8

| X | Y |
|---|---|
| 0.7570 | 0.1293 |
| .7646 | .1260 |
| .7718 | .1221 |
| .7794 | .1175 |
| .7875 | .1122 |
| 0.7888 | .1112 |
| .8050 | .0990 |
| .8142 | .0909 |
| .8236 | .0819 |
| .8232 | .0719 |
| 0.8429 | .0609 |
| .8526 | .0488 |
| .8622 | .0354 |
| .8716 | .0233 |
| .8709 | .0090 |
| 0.8807 | 0.000 |

| X | Y |
|---|---|
| 0.0000 | 0.2419 |
| .1000 | .2213 |
| .2000 | .2007 |
| .3000 | .1801 |
| .4049 | .1585 |
| 0.4668 | .1508 |
| .5188 | .1468 |
| .5616 | .1468 |
| .5963 | .1443 |
| .6239 | .1442 |
| 0.6522 | 0.1442 |
| .6685 | .1441 |
| .6813 | .1439 |
| .6915 | .1436 |
| .6998 | .1432 |
| 0.7104 | 0.1429 |
| .7124 | .1421 |
| .7174 | .1415 |
| .7221 | .1408 |
| .7266 | .1399 |
| 0.7311 | 0.1389 |
| .7357 | .1376 |
| .7407 | .1361 |
| .7460 | .1343 |
| .7517 | .1320 |

FIG. 13 OPERATIONAL SCHEMATIC OF TRANSMISSION (1)

CONTINUOUSLY VARIABLE TRANSMISSION

BACKGROUND OF THE INVENTION

The following is an improvement of application Ser. No. 06/568,591 now abandoned.

FIELD OF THE INVENTION

The present invention relates to continuously variable transmission devices and more particularly to a transmission device which is continuously variable over a predetermined range.

The embodiments of the present invention described herein are particularly adaptable for use as a bicycle transmission although other uses of the transmission may be recognized by those skilled in the art. The present invention generally belongs to a family of devices called speed changers, or transmissions, and more specifically to a group within the transmission category called continuously variable transmissions. Such transmissions provide an infinite number of ratios as they are varied from one end of their ratio limits to the other. Transmissions that fall within the continuously variable family may be hydraulic, mechanical direct drive, or pulsed drive.

The continuously variable transmission ("CVT") of the present invention is a mechanical drive with a unique pulsed drive speed multiplier superimposed thereon. The CVT multiplies the basic input speed from a one-to-one ratio to whatever top ratio is provided for the transmission. While the present invention is described, in its preferred embodiments, as being useful as a bicycle transmission, the concept may be used in any application where the rpm of the prime mover input is required to provide a continuously variable output rpm to the load. Such additional uses may include transmissions for mopeds, motorcycles, automobiles, AC electric motors, and other types of vehicles and industrial equipment.

DESCRIPTION OF THE PRIOR ART

A variety of CVTs have been proposed, but such transmissions have been relatively complex employing a large number of moving parts or severely limited as to load capacity (e.g. traction drives). Previously proposed CVTs employing the pulsed drive design have failed to reduce the mechanical pulses or torque amplitude (ripple) inherent in such systems to an acceptable level throughout the ratio range. Furthermore, none of these transmissions have been capable of producing a ratio range broad enough for many applications, such as the generic 'mountain bike' or present day automobile. Some of these are shown in U.S. Pat. No. 3,803,931; Italian patent No. 462,666; U.S. Pat. Nos. 3,229,549; 3,073,173; 2,199,051; 4,181,043 and 4,194,407.

OBJECTS OF THE INVENTION

A primary object of the present invention is to provide a continuously variable transmission capable of producing a broad ratio range suitable for employment in bicycles or automobiles.

Another object is to provide a CVT with a pulse drive system which virtually eliminates the mechanical pulses or torque amplitude (ripple) inherent in such prior art systems.

An additional object is to provide a CVT having a minimum number of moving parts and capable of a large load capacity.

A further object is to provide a CVT which exponentially multiplies the input speed from a one-to-one (direct drive) ratio to a predetermined maximum ratio.

A still further object is to provide a CVT which permits the ratio to be altered at any time including while under full load, while freewheeling or while at a standstill.

Further objects of the invention will become apparent as the description proceeds.

SUMMARY OF THE INVENTION

In accordance with one aspect of the present invention, a continuously variable transmission ("CVT") is provided which, by proper selection of internal gearing ratios, exponentially multiplies the input speed from a one-to-one ratio to a designed maximum ratio. At the lowest ratio of input to output rpm (i.e. one-to-one) the mechanism is locked within an output housing and operates as a single speed direct drive with the entire transmission turning freely on bearing surfaces about a main shaft.

Proper location of a centrally disposed eccentric mechanism, which controls the turning ratio of a planetary gear system, permits changes in the ratio to be made in infinitely variable increments. The planetary gears are mounted on overrolling clutch members which limit the planetary gears' rotation to only one direction.

The amount of eccentricity of the eccentric mechanism relative to the main shaft changes the orientation of the planetary gears relative to the eccentric. As a result, the output rotational speed imparted by the planetary gears to the transmission housing may be greater than the input rotational speed. This additional rotative speed is imparted sequentially, in a ratchet-like manner, to increase the number of turns of a planet carrier in relation to an input sun gear. This exponentially multiplies the input speed of the transmission.

The transmission of the present invention provides a number of advantages over prior art CVTs. These advantages include providing a transmission which is continuously and infinitely variable up to the full input to output ratio. This is accomplished without any movement of the input or output means or disengaging of the transmission from the driving load.

The transmission further permits the variation of the output speed during periods when the transmission is driving a full load. This is because the transmission provides a positive drive at all output speeds and loads throughout the entire ratio range. Additionally, the output speed and torque are smooth and ripple free throughout the ratio range when the input speed and applied torque are smooth and constant.

BRIEF DESCRIPTION OF THE DRAWING

The various features and advantages of this invention will be more fully understood by reading the following detailed description, together with accompanying drawings, in which:

FIG. 5 is a sectional view taken on line 5—5 of FIG. 4.

FIG. 8 is a plan view of the eccentric change mechanism of a preferred embodiment of the present invention.

FIGS. 9-11 are sectional and plan views of the planet shaft of a preferred embodiment of the present invention.

DETAILED DESCRIPTION OF THE PREFERRED EMBODIMENTS

Figure 1:
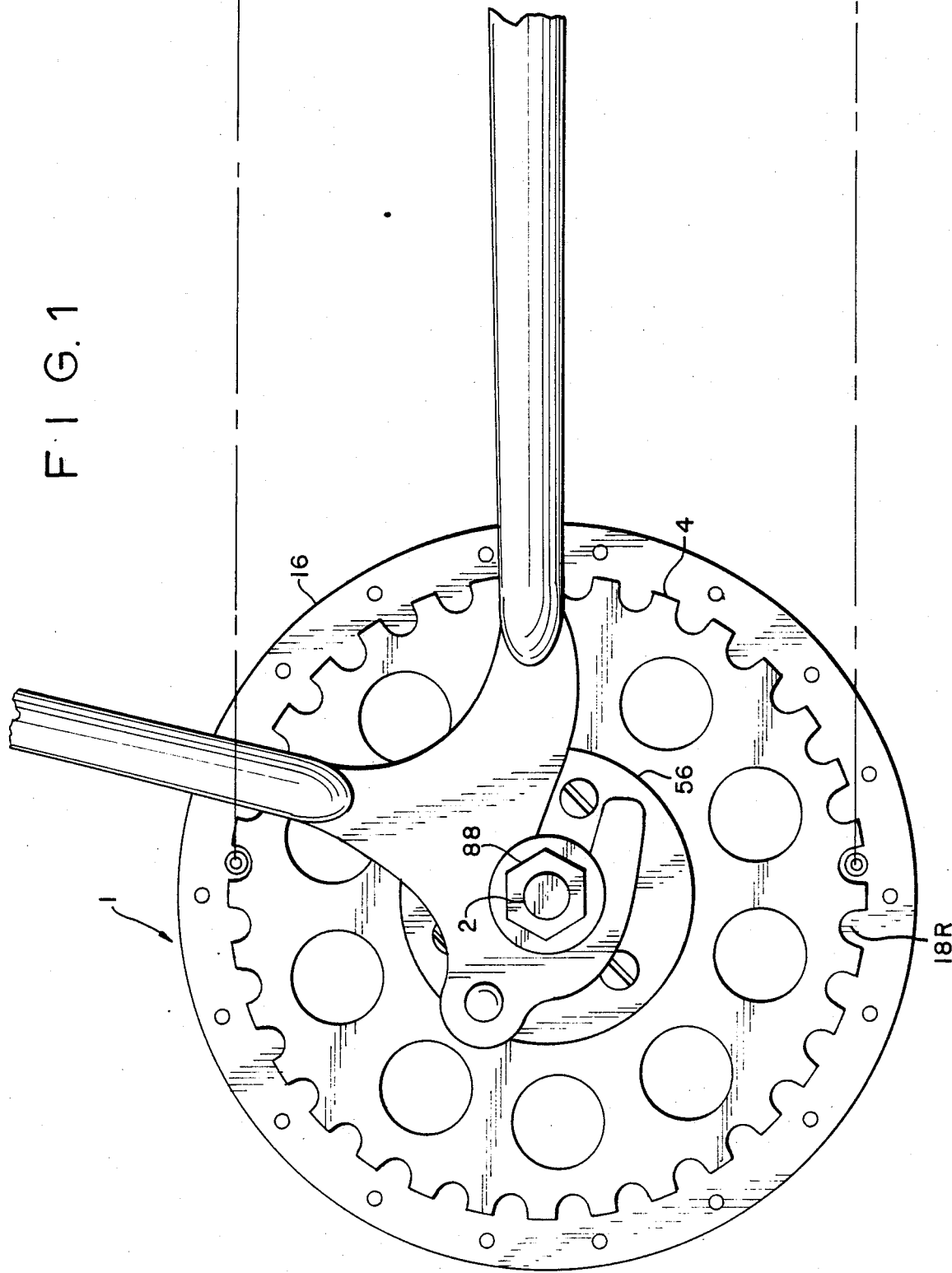
FIG. 1 is a right side plan view of a preferred embodiment of the present invention.
Figure 2:
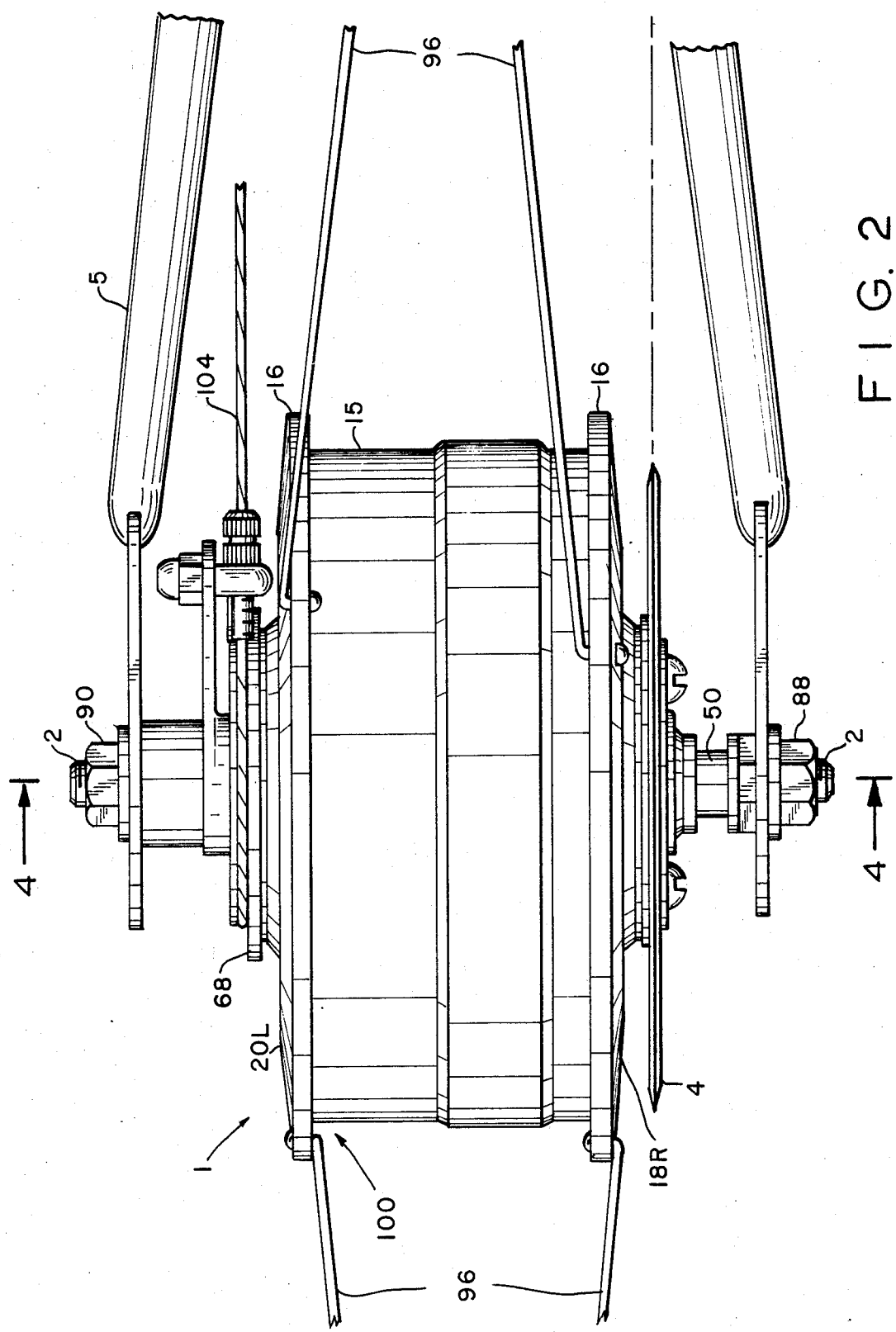
FIG. 2 is a top plan view of a preferred embodiment of the present invention.
Figure 3:
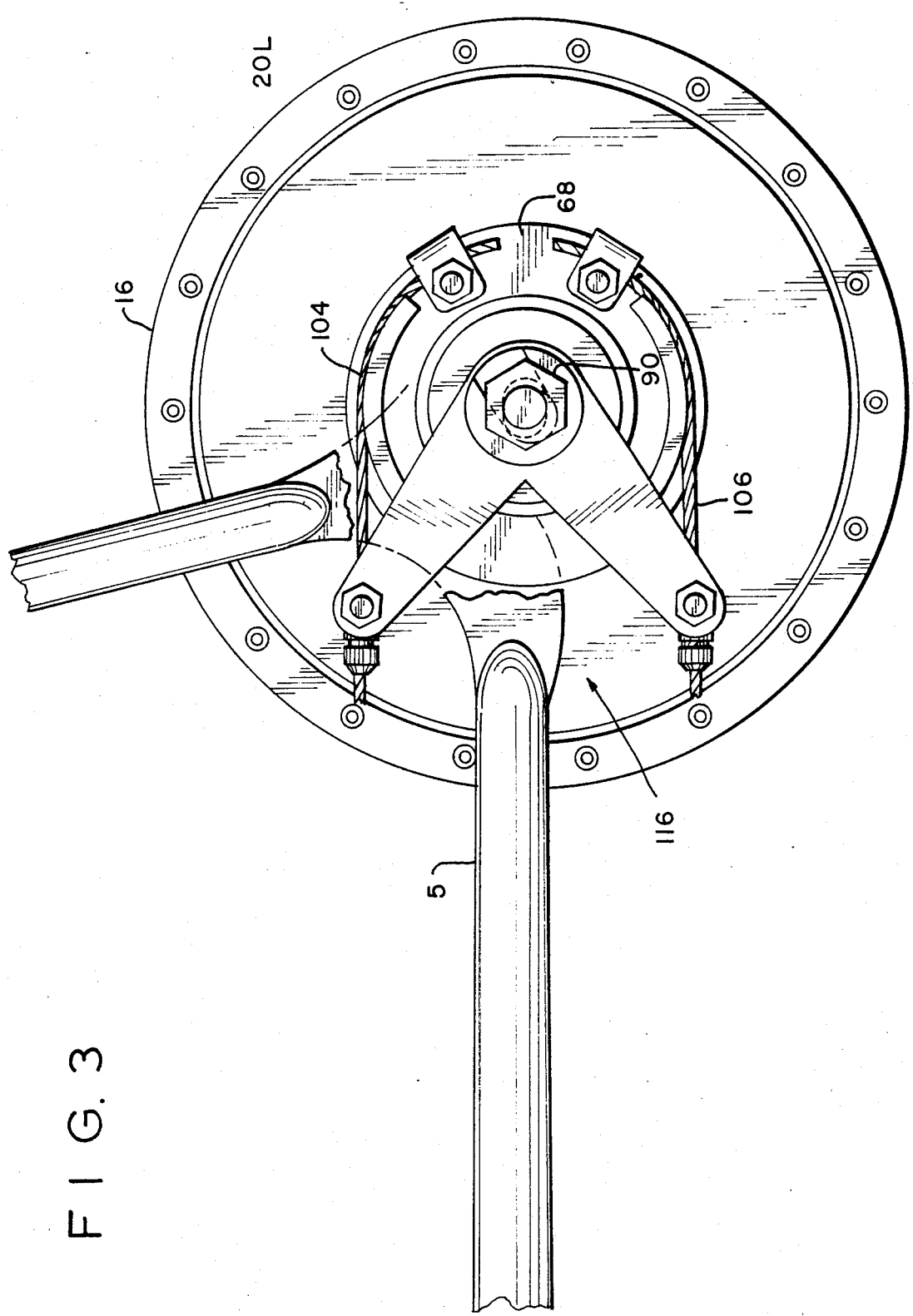
FIG. 3 is a left side plan view of a preferred embodiment of the present invention.

Referring now to the drawings and initially to FIGS. 1 and 2, the transmission 1 of the present invention is shown in a preferred embodiment as a transmission for a bicycle (not shown). As such it is mounted within the rear forks 5 of the bicycle (not shown) as the center hub of the bicycle's rear wheel (not shown). The central or main shaft 2 is locked into the rear forks 5 of the bicycle in a standard manner by shaft nuts 88 and 90, respectively. The spokes 96 radiate outwardly from spoke rings 16 on the left and right side of the transmission housing assembly 100, and are secured in a normal manner to a standard rim (not shown) of the rear wheel. A bicycle chain (not shown) is engaged around an input sprocket wheel 4 to impart driving rotation to the transmission 1. Ultimately, driving rotation is imparted to the transmission housing assembly 100 to rotate the rear wheel of the bicycle.

In a preferred embodiment of the present invention, the transmission 1 is designed to vary the input to output rpm ratio from a one-to-one ratio up to a maximum ratio on the order of three-to-one or four-to-one. (Higher ratios are possible with the selection of the appropriate internal gear components.) Change in the ratio output of the transmission 1 is accomplished smoothly and uniformly by adjustment of an eccentric control means (shown schematically in FIG. 13). Control cable 9, tensioned by the control means, acts to rotate an eccentric alter mechanism 102 (to be described more fully hereinafter) and thereby alter its orientation.

Figure 13:
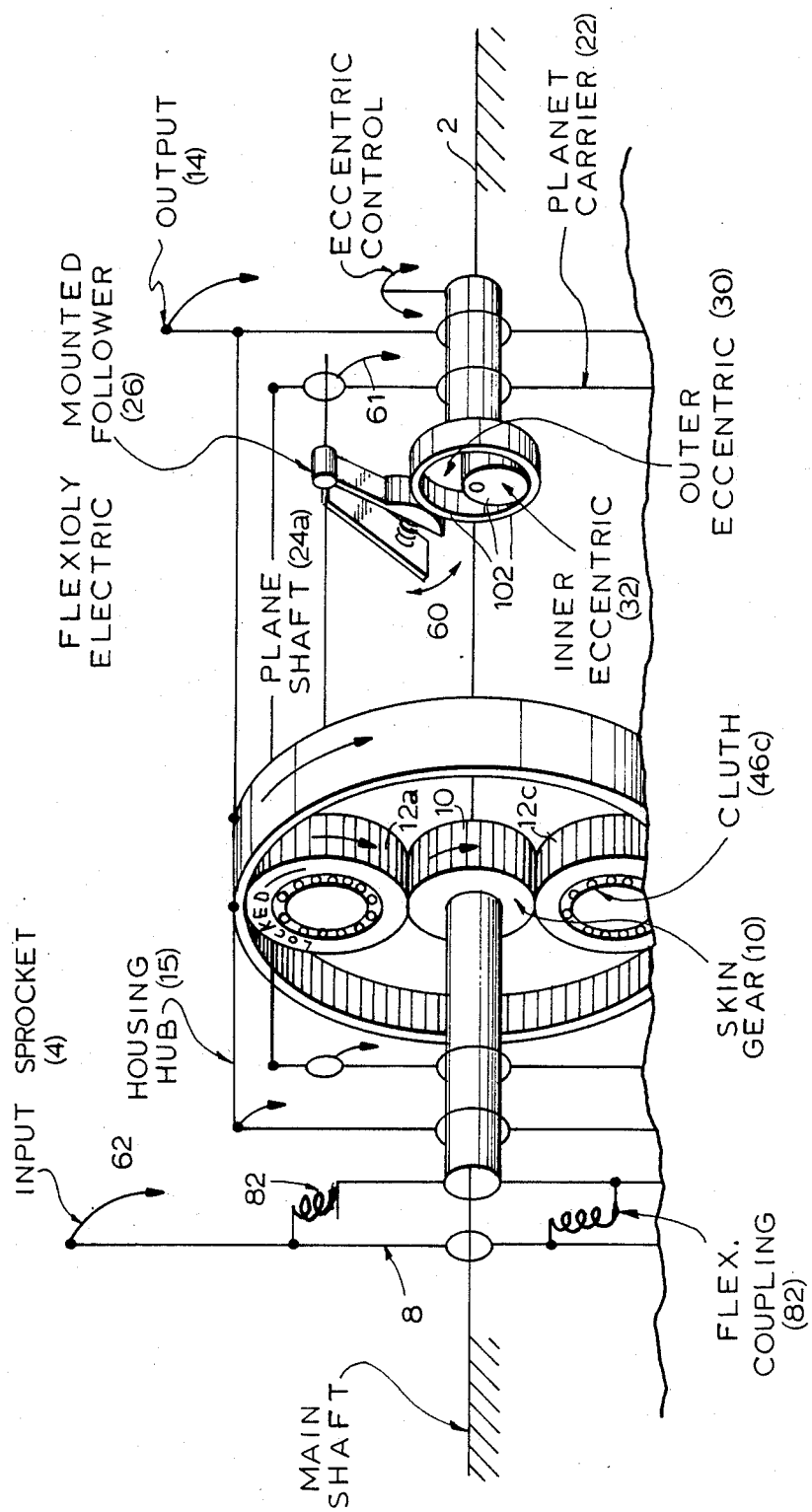
FIG. 13 is a diagrammatic representation of the principles of operation of the transmission of the present invention.

Reference is now made to FIG. 13 for a brief description of the theory of operation of the transmission 1 of the present invention. In FIG. 13, the input torque to the transmission 1, imparted by the input sprocket wheel 4 to the sprocket hub 8, is indicated by arrow 62. This rotation, in turn, is ultimately imparted to a sun gear 10 through a flexible coupling 82. A plurality of planet gears 12a, b, etc. are meshed between the sun gear 10 and an internal hub gear 14. (In the accompanying figures a four planet gear system is illustrated. A six planet gear system is even more effective for certain applications, and ultimately virtually any number of planet gears may be employed). Each planetary gear 12a, b, etc. is mounted on a separate planetary gear shaft 24a, b, etc. with each end of the shaft being journalled within a planet carrier 22. Thus rotation of the input sprocket wheel 4, through the flexible coupling 82, rotates the sun gear 10 about main shaft 2. The sun gear 10 rotates planet gears 12a, b, etc. which in turn drive the internal hub gear 14 (which is an integral part of the housing hub 15). Rotation of the housing hub 15 and correspondingly the rest of transmission housing 100 drives the rear wheel spoked to it.

Each planetary gear 12a, b, etc. is mounted on its respective shaft 24a, b, etc. through its respective over-rolling clutch 46a, b, etc. The clutch 46a, b, etc. allows each planetary gear 12a, b, etc. to rotate about its shaft 24a, b, etc. only in the direction opposite to and against the force being applied by the input from the sun gear 10 when the transmission 1 is turning in a driving mode direction. Each planetary gear shaft 24a, b, etc. has an integral torque arm 126a, b, etc. associated with it. Each integral torque arm 126a, b, etc. is flexibly connected to an eccentric cam follower 26a, b, etc. which rides about the outer race 124 of the eccentric change mechanism 102. When the eccentric change mechanism 102 is centrally positioned so that there is, in essence, no eccentricity in relation to the main shaft 2, each planetary gear 12 a, b, etc. is locked against any rotation in the drive direction. Each planetary gear 12 a, b, etc. is thus locked to the sun gear 10 and the internal hub gear 14. A one-to-one ratio is imparted between the input sprocket wheel 4 and the transmission housing hub 15.

The internal hub gear 14 is meshed with planetary gears 12 a, b, etc. and is rotated by the sun gear 10 through the planetary gears 12 a, b, etc. By adjusting the position of the eccentric change mechanism 102, the relative position of the eccentric cam followers 26a, b, etc. changes to cause, a sequential fashion, each planetary gear 12 a, b, etc., in turn, to "walk" at a faster rate about the sun gear 10 than the sun gear 10 is rotating. This exponentially multiplies the output rotation imparted to the internal hub gear 14 by the degree or rate of the "walk" (rotation). The ratio change hub 64 is shown schematically by the two-way arrow 60 whose movement controls the degree or amplitude of the movement of the eccentric cam followers 26a, b, etc. in the direction indicated schematically by arrow 61.

Figure 4:
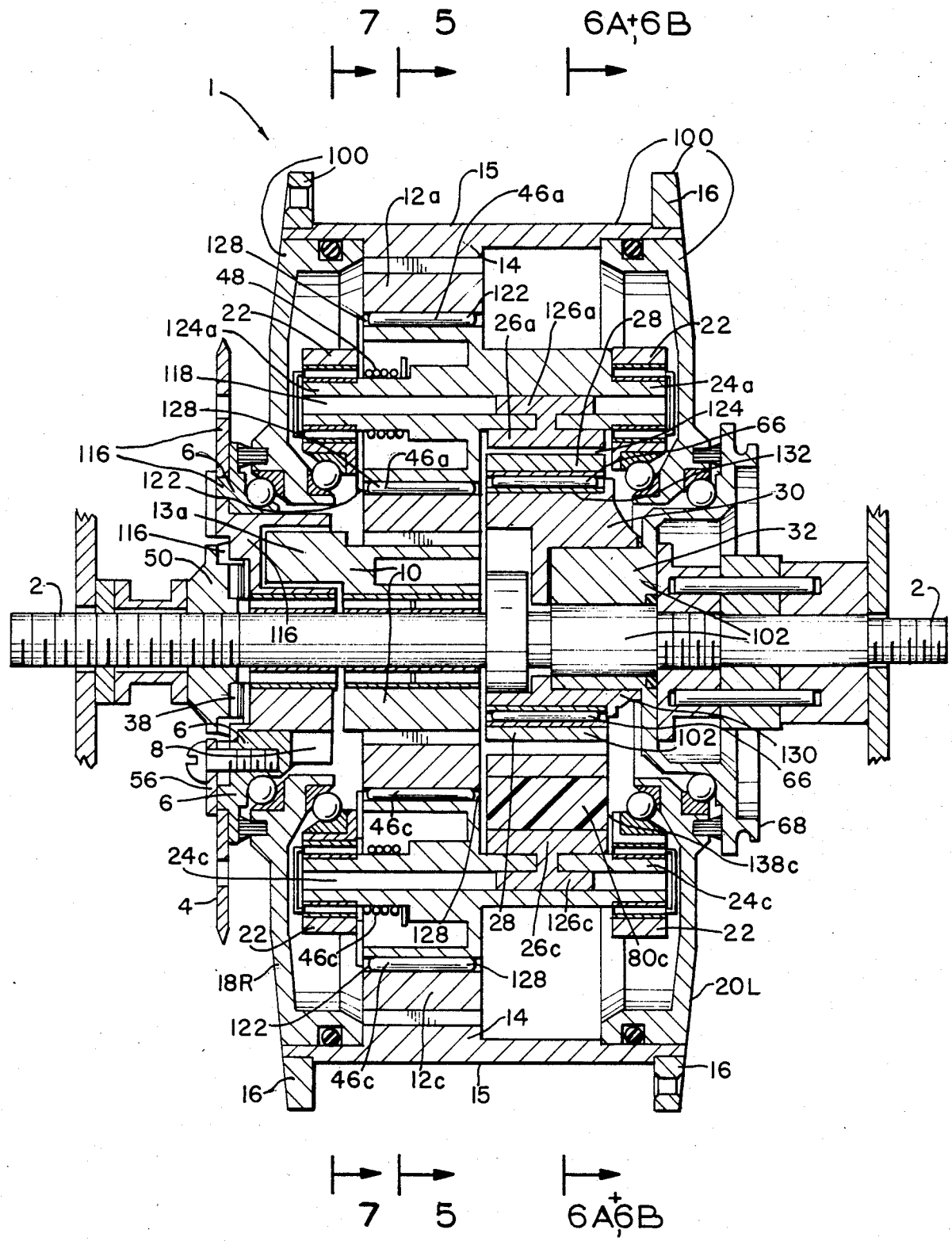
FIG. 4 is a sectional view of a preferred embodiment of the assembled transmission.

Reference is now made to FIG. 4 for a description of the assembled transmission 1 of the present invention. The main shaft 2 runs through the entire transmission assembly 1 and is suitably journalled therein. The main shaft 2 is centrally located in relation to all the internal components of the transmission 1. This permits the rear wheel of the bicycle to "free-wheel" when torque is not being applied through the drive chain.

The sprocket drive assembly 116 turns about the main shaft 2 and is retained thereon by a lock nut 50. A thrust bearing 38 is interposed between the sprocket drive assembly 116 and the lock nut 50. The input sprocket wheel 4 is fitted onto a sprocket hub ring 6 and held in place by a sprocket retainer ring 56. The entire assembly 116 interacts with extension fingers 13 a, b and c through the flexible coupling 82. The extension fingers 13a, b, and c are integral with the sun gear 10. Thus, rotation of the sprocket drive assembly 116 causes the sun gear 10 to rotate.

Wheel spokes 96 are secured to the spoke rings 16 which are integral with the housing hub 15 of the transmission 1. The housing hub 15, which has an integral internal hub gear 14, abuts against two end plates 18R and 20L. These components, together, comprise the transmission housing assembly 100.

As explained above, the rotation of the input sprocket wheel 4 rotates the sun gear 10 at a fixed one-to-one ratio. The rotation of the sun gear 10, in turn, causes each of the planetary gears 12 a, b, etc., when in a locked position, to rotate in synchronous fashion with the sun gear 10. Rotation of the planet gears 12 a, b, etc. then directly rotates the internal hub gear 14 thereby rotating the housing hub 15 synchronously with the sun gear 10. A ratio greater than one-to-one is obtainable by adjusting the eccentric change mechanism 102. (explained further below) This eccentric adjustment, alters the degree of rotation of the planetary gears 12 a, b, etc. with respect to the sun gear 10 so that each planetary gear 12 a, b, etc., in sequence, imparts a greater degree of rotation to the internal hub gear 14 than is imparted by the rotation of the sun gear 10 alone. In essence, the driving planetary gear 12 a, b, etc. "walks" faster about the sun gear 10 than the sun gear 10 rotates. In this manner the rpm of the input is exponentially multiplied, depending upon the "walk" speed of the planetary gear 12 a, b, etc., which, in turn, is dependent upon the degree or amount of eccentricity selected by the eccentric control means (not shown).

Reference is now made to FIGS. 5 through 11 to describe the operation of the eccentric change mechanism 102. Each planetary gear 12 a, b, etc. is mounted through an overrolling clutch 46 a, b, etc. on an inner raceway 122 of the planet gear shaft 24 a, b, etc. Thus, turning a planet gear shaft 24 a, b, etc. a slight degree will alter the relationship between the sun gear 10 and that associated planetary gear 12 a, b, etc.

Each planet gear shaft 24 a, b, etc. has a corresponding eccentric cam follower 26a, b, etc. to contact the surface of the eccentric ring 28. As the position of the eccentric change mechanism 102 is varied to change the degree of eccentricity and thus the gear ratio, the orientation of the eccentric cam followers 26a, b, etc. is changed to impart a like change to the planetary gear shafts 24a, b, etc.

In a first preferred embodiment of the present invention, each planetary gear shaft 24a, b, etc. includes a first end 118 which is journalled in the planet carrier plate 22, an intermediate portion 120 containing the clutch raceway 128, a torque arm 126 which transfers the torque applied by the cam follower 26a, b, etc. through the planet shaft flexible coupling 80a, b, c, etc. Each eccentric cam follower 26a, b, etc. is biased into contact with the external surface of eccentric cam ring 28 by a tension spring 48 anchored on the planet carrier 22.

Figure 14:
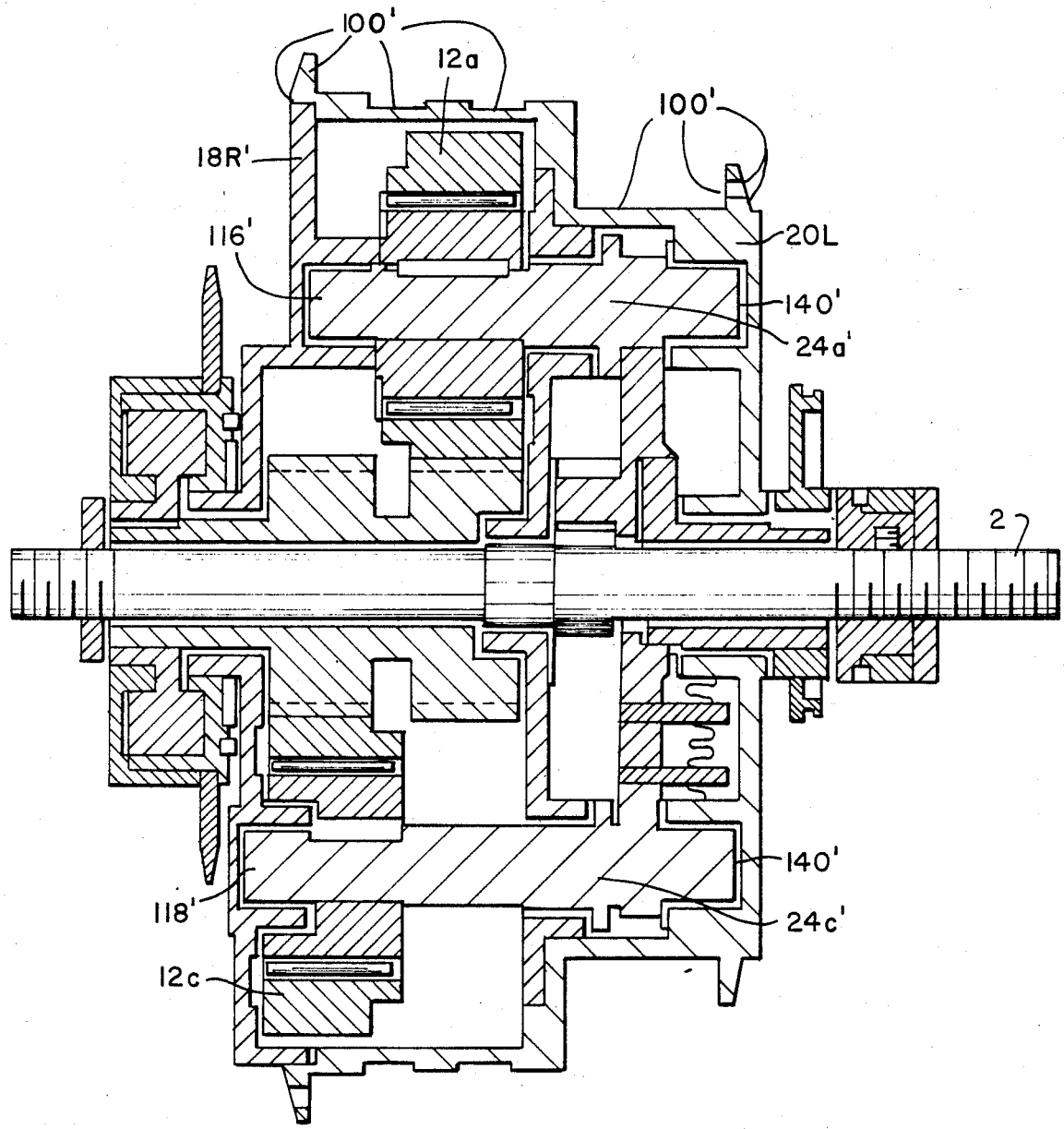
FIG. 14 is a sectional view of another preferred embodiment of the assembled transmission.

In a second preferred embodiment of the present invention (see FIG. 14), each planetary gear shaft 24a', b', etc. is journalled at its first end 118' to end plate 18R' and at its second end 140' to end plate 20L'. As such, there is no planet carrier 22 or internal hub gear 14. In this embodiment the transmission housing assembly 100' is directly driven by the journalled planet shafts 24a', b' etc. as the planet gears 12a', b', etc. rotate.

When a particular degree of eccentricity is selected by the eccentric control means, and each planetary gear 12 a, b, etc. is rotated by the sun gear 10, its eccentric cam follower 26a, b, etc. oscillates inwardly and outwardly about the eccentric ring 28. When the eccentric cam follower 26a, b, etc. oscillates in the inward direction, the planetary gears' inner raceway 122 turns in an opposite direction (counterclockwise) and "freewheels" since it is not constrained from rotation in that direction. However, when the eccentric cam follower 26a, b, etc. oscillates outwardly (clockwise), the planetary gears' inner raceway 122 is precluded from rotation within the planetary gear by the overrolling clutch 46a, b, etc. Each planetary gear 12 a, b, etc. which is in the locked position, is forced, in a ratchet fashion, to "walk" in a clockwise direction about the sun gear 10 which is also turning in a clockwise direction. The degree or rate of the "walk" is an additive speed factor which multiplies the basic speed of rotation of the sun gear 10.

The eccentric change assembly 102 includes an inner eccentric 32, an outer eccentric 30, a needle bearing 66, and an outer eccentric ring 28. The inner eccentric 32, which is integral with ratio change hub 68, is journalled on raceway 130. The ratio change hub 68 is mechanically connected to control cables 104 and 106. Thus, movement of cable 104 will rotate the inner eccentric 32 in one direction and movement of cable 106 will rotate the inner eccentric 32 in the opposite direction. The outer eccentric 30 is journalled on raceway 130 of the inner eccentric.

As noted above, the outer eccentric 30 is journalled on the raceway 130 of the inner eccentric 32. The outer surface of the outer eccentric 30 itself contains a raceway 132 upon which is journalled the eccentric needle bearing 66 and the eccentric ring 28. The left side of the outer eccentric 30 (as seen in FIG. 8) includes an extending protrusion 108 having a shape in the cross section of a 300° circle and whose inside end is integral with an outer eccentric web 110. The extending protrusion 108 is designed to interlock with a corresponding key slot 112 formed within a yoke segment 114 which is integral with the main shaft 2 at or near its midpoint. Since the outer eccentric 30 is locked in yoke 114 and is free to rotate about the raceway 130 of the inner eccentric 32, rotation of the inner eccentric 32 caused by the ratio change hub 68 will pivot the outer eccentric 30 about the center line of the extending protrusion 108 an equal amount of rotation and in the opposite direction as the rotation of the inner eccentric 32. This will vary the relationship between the inner eccentric 32 and outer eccentric 30 by exactly twice the amount of rotation imparted by the input of ratio change hub 68 to the inner eccentric 32. When the nested eccentrics 30 and 32 are rotated in this manner, the load force imparted on the outer eccentric ring 28 by the eccentric cam followers 26 a, b, etc. causes the eccentrics 30 and 32 to react to the force against each other thereby allowing the ratio to be changed while under load. The counterrotation of the inner and outer eccentrics (30 and 32) in this manner will increase or decrease the distance between the centerline of the outer eccentric 30 and the main shaft 2.

In the zero eccentricity position, the main shaft 2 will be concentric with eccentric ring 28. In this position, the transmission 1 is locked in its one-to-one ratio. Progressive rotation of the inner eccentric 32 to its maximum degree of rotation (the maximum amount of eccentricity between the centerline of the main shaft 2 and the periphery of eccentric ring 28) results in a relative dimensional orientation wherein the distance from the center line of the main shaft 2 is at its greatest dimension resulting in the maximum degree of eccentricity.

Figure 6A:
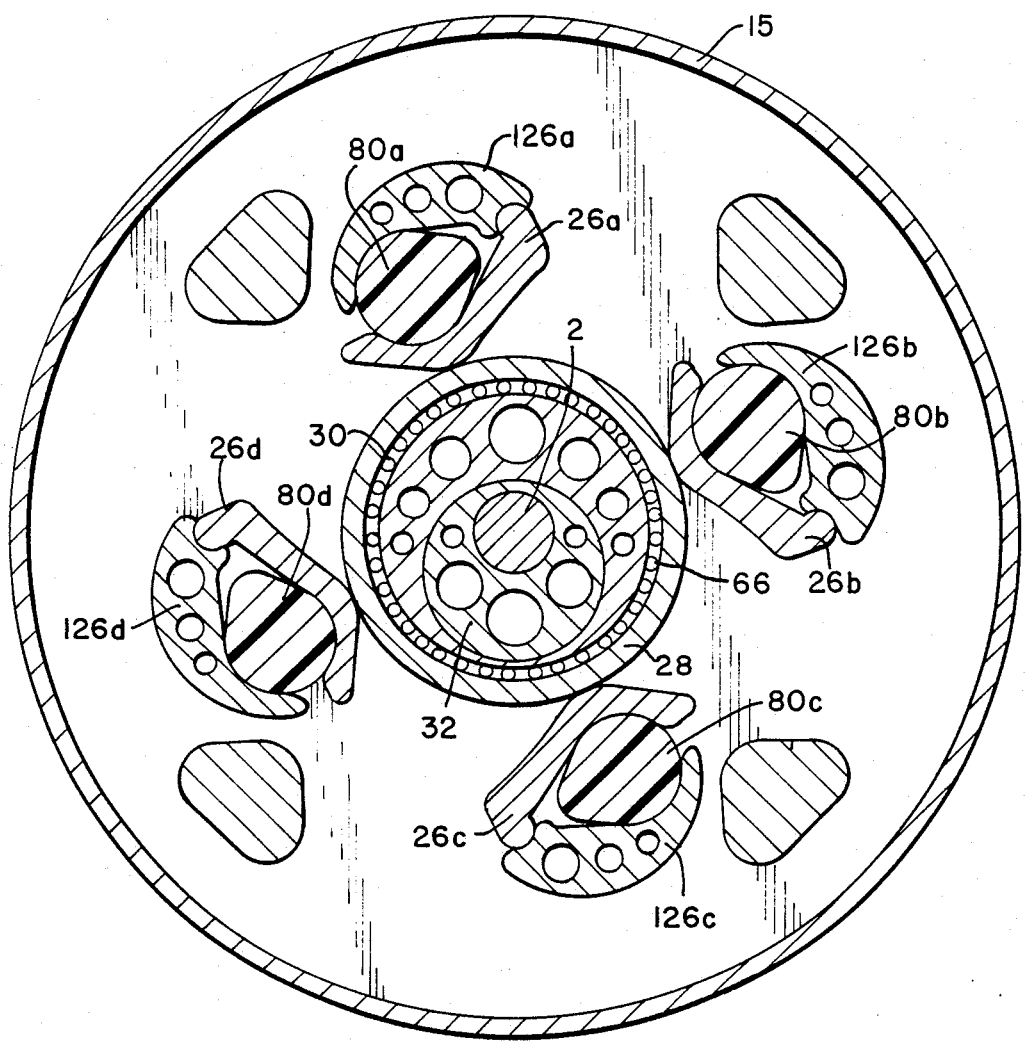
FIG. 6A is a sectional view taken on line 6A and B—6A and B of FIG. 4 showing the eccentric change mechanism in a concentric position.
Figure 6B:
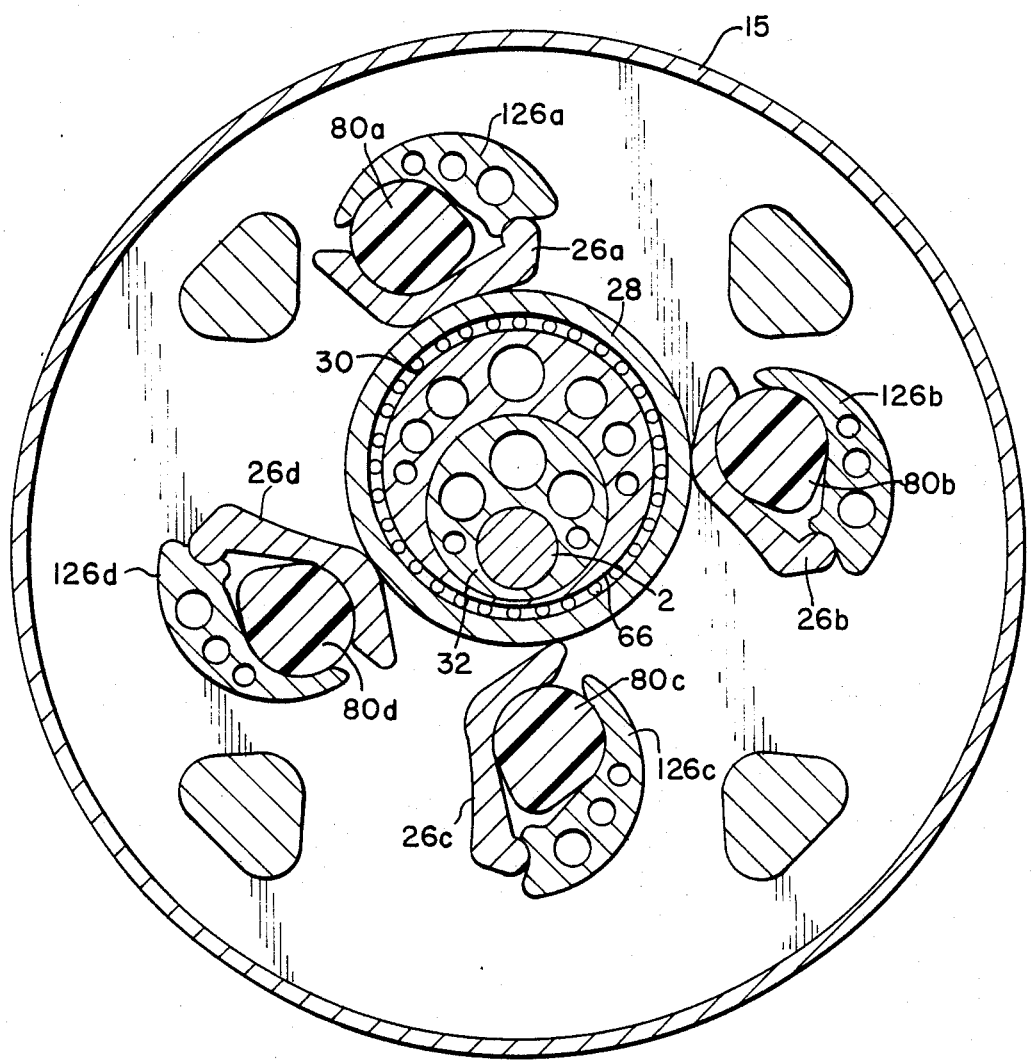
FIG. 6B is a sectional view taken on line 6A and B—6A and B of FIG. 4 showing the eccentric change mechanism in a eccentric position.

As seen in FIG. 6B, when the inner eccentric 32 has been rotated to impart a degree of eccentricity between the axis of the main shaft 2 and the eccentric ring 28, each of the eccentric cam followers 26 a, b, etc. is at a different angular relationship. When the main shaft 2 is concentric with the outer surface of the eccentric ring 28 all of the eccentric cam followers 26a, b, etc. will be at the same angular orientation (see FIG. 6A). Since springs 48 a, b, etc. urge the eccentric cam followers 26 a, b, etc. into contact with the eccentric ring 28, each eccentric cam follower 26 a, b, etc. will have its orientation progressively changed based on its circumferential position during rotation. When a particular eccentric cam follower 26 a, b, etc. is moved to its maximum displaced position, its respective planetary gear 12 a, b, etc. has been rotated in a like manner through the same arc thus advancing the internal hub gear 14 a proportional amount.

Because all of the planetary gears 12 a, b, etc. are meshed with the same input sun gear 10 and the internal hub gear 14, all planetary gears 12 a, b, etc. turn at the same rate of rotation at all times. Each eccentric cam follower 26a, b, etc. and its associated planetary gear 12a, b, etc. sequentially picks up the driving function from the next preceding one and continues to drive the transmission hub assembly 100 about the sun gear 10 at a constant rate. Because the planet carrier end plate 22 is driven at an increased rate of rotation around the sun gear 10 by the pulsed, ratchet-like action of the planetary gears 12 a, b, etc., the speed of rotation of the transmission hub assembly 100 is increased proportionally. The net result is that the faster the planet carrier end plate 22 turns, the more times the eccentric cam followers 26 a, b, etc. rotate about the eccentric change mechanism 102 and the more times the planetary gears 12a, b, etc. then revolve about the main shafts. This, in turn, causes an increased number of pulses which drives the planet carrier end plate faster, and so on. The end result is an exponential multiplication of whatever increase is superimposed on the basic rate of rotation of the sun gear 10.

The planet gear 12a, b, etc. associated with a positively displaced eccentric cam follower 26a, b, etc. becomes the driving gear any time its angular velocity in a clockwise direction of rotation becomes greater than any of the other planetary gears 12 a, b, etc. When not in a one-to-one ratio, each planetary gear, during its drive mode, imparts to the planet carrier end plate 22 and internal hub gear 14, a faster rate of rotation than the input sun gear 10. The amount of increase in the output speed of rotation is a multiple of the input drive speed. As the wheel of the bicycle rotates, the next planetary gear 12 a, b, etc., in sequence, taxes over the driving effect to increase the output by a series of "pulsed" ratchet movements. The output speed of the drive is clearly dependent on the degree of eccentricity imparted to the eccentric cam followers 26 a, b, etc. since they control the amount (degrees) of the multiplying rotation imparted to the planetary gears 12 a, b, etc.

All of the cam followers 26 a, b, etc. are more inwardly (counter clockwise) biased by springs 48a, b, etc. than the one driving the internal hub gear. This inward bias allows each associated planetary gear 12a, b, etc. to rotate freely in the opposite direction. This causes the overrolling clutches 46 a, b, etc. to unlock and allows their respective planetary gears to overroll their clutch raceways 128 a, b, etc.

Figure 12:
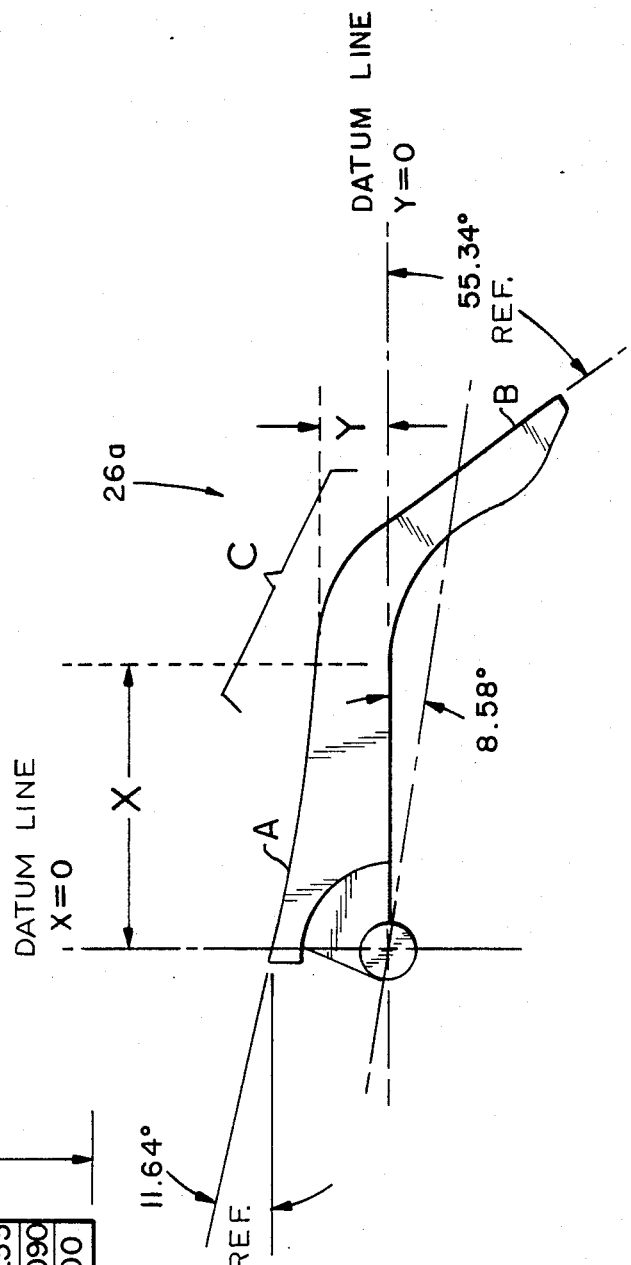
FIG. 12 is a detailed plan view of a cam follower of a preferred embodiment of the present invention and a chart showing the generation of critical dimensions for the cam surface.

Reference is now made to FIG. 12 where detail of the eccentric cam followers 26 a, b, etc. is shown along with a table of critical dimensions. It has been determined that a critical relationship exists at each eccentric cam follower's 26a, b, etc. point of contact with the cylindrical exterior surface of eccentric ring 28. The critical factor is that the angular velocity of the planetary gear 12 a, b, etc. rotation must remain constant throughout the arc of rotation about the eccentrics when the particular planetary gear 12a, b, etc. is in the drive mode. If, the angular velocity is not constant, an irregular or "pulsing" drive will be imparted. Thus, the shape of the eccentric cam followers 26a, b, etc. where they contact the cylindrical outer surface of the eccentric ring 28 is critical.

An equally critical requirement is that the output torque from the planetary gear 12 a, b, etc. must be maintained at a constant level throughout the entire drive phase of each planetary gear 12 a, b, etc. Otherwise, an uneven or pulsed reaction force will be reflected back through the system to the pedals (not shown) and may, at certain harmonic frequencies, amplify the effect through the hysteris caused in the system. Therefore, both the angular rate of rotation and the force (torque) level terms must be incorporated into the empirical equation that defines the dimensions of the eccentric cam follower contact surface.

In FIG. 12, there is shown an eccentric cam follower with a table of dimensions calculated using an eccentric ring having an outside diameter of 1.813 inches and a planetary gear shaft bolt circle of 3.042 inches in diameter. Thus, from, the X and Y datum lines shown, which are disposed at the angular relationships indicated with respect to the axis of the eccentric cam follower shaft, the X and Y coordinates will have the values indicated in the table.

In essence, the contact surface of each eccentric cam follower 26a, b, etc. at maximum eccentricity extends generally from point B to point A. Starting at B there is a straight line segment running at an angle of 55.34° to the datum line Y to the rounded portion starting at C where the critical shape of the follower defines the shape required for a constant rate of rotation of the planetary gear shaft 24a, b, etc. throughout the driving phase of the section C, and then maintaining a slight curve upward to A. From A to the end of the surface is roughly a straight line surface running at 11.64° to the reference datum line to a point 0.241 inches from datum line Y at the point where it crosses datum line X.

Figure 7:
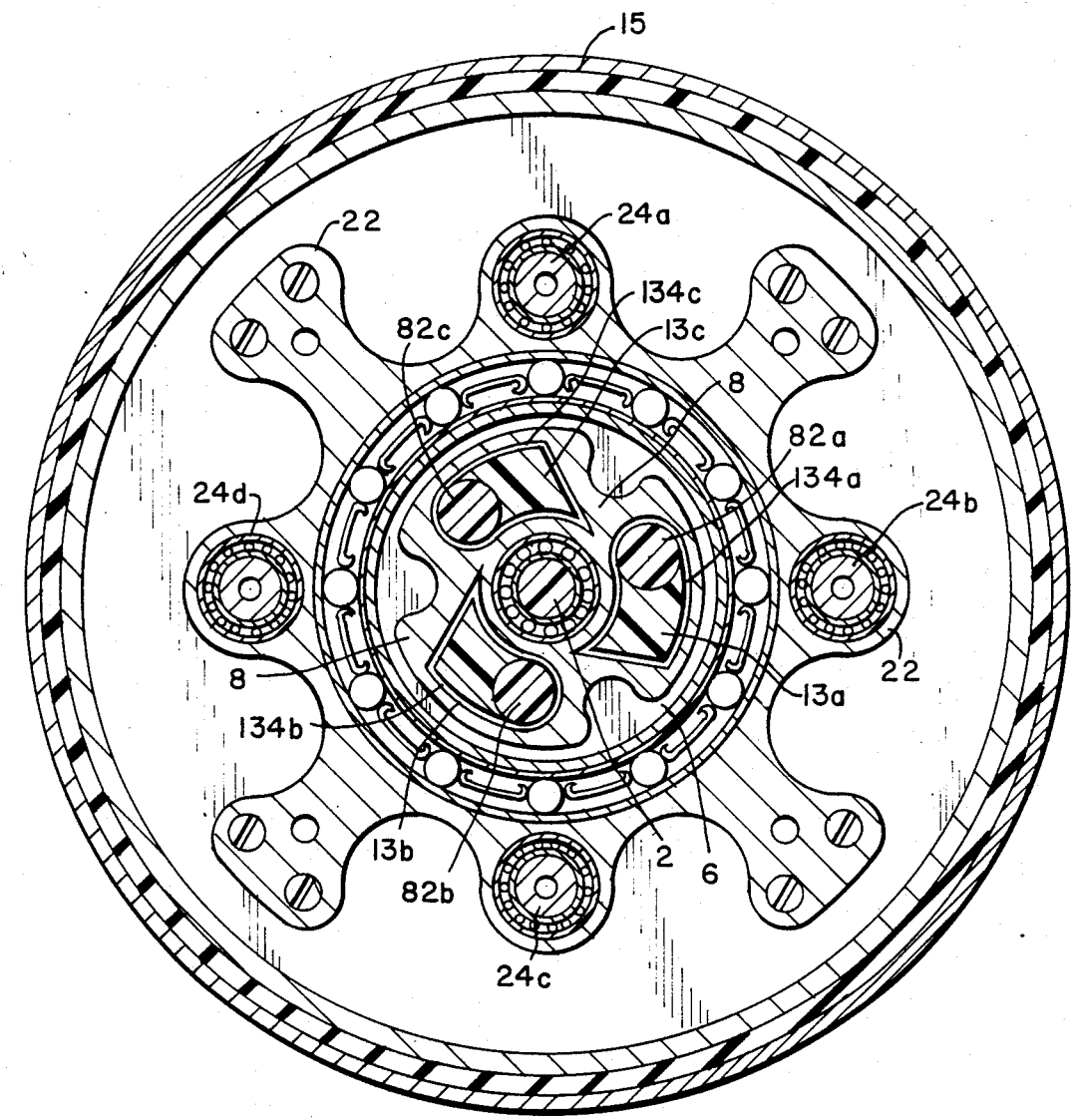
FIG. 7 is a sectional view taken on line 7—7 of FIG. 4.

Reference is now made to FIG. 7 for a description of flexible coupling 82. Recessed into the input sprocket wheel 4 are slotted arcs 134a, b and c to receive neoprene springs 82a, b, c and extension fingers 13a, b, c which are integral with the sun gear 10. The slots 134a, b and c, recessed into the sprocket hub 8, are designed to allow a discreet number of degrees of rotation between the sprocket hub 8 and the sun gear 10. This is to absorb any irregular spike forces that might be transmitted from the sun gear 10 through the flexible coupling 82 to the sprocket hub 8. In other words, this assembly removes or absorbs any ripple or shock effect to the pedals that may be transmitted through the rings of the chain (not shown).

Reference is now made to FIGS. 4, 6A and 6B for a description of the flexible coupling 80 between the planetary gear torque arm 126 and the eccentric cam followers 26a, b, etc. The eccentric cam followers 26a, b, etc. are each inserted into a slot 138a, b, etc. in the planetary gear shafts 24a, b, etc. and rotated to a position that locks them into the shafts 24a, b, etc. In this position, the flexible coupling 80 is mounted between the planetary gear shaft torque arm 126a, b, etc. and the eccentric cam follower 26a, b, etc. When the eccentric cam followers 26a, b, etc. are oscillated to ratchet the planetary gears 12a, b, etc. forward, the shock of the clutching and de-clutching of the overrolling clutches 46a, b, etc. from their respective raceways is isolated from the eccentric cam followers 26 a, b, etc. The flexible coupling springs 80 a, b, and c are also capable of compensating for any inaccuracies in manufacturing tolerances that might otherwise be reflected as irregularities in angular velocities or torque forces during the planetary gear drive phase.

It is seen that the present invention provides a unique and particularly adaptable continuously variable speed transmission which can effectively vary the output rpm in a continuous manner throughout a wide range of ratios when the transmission is under load, not rotating or at a standstill, without any of the ripple forces or irregularities being felt by the rider through the pedals from the input sprocket. The transmission utilizes a ratchet-like effect to sequentially "walk" a plurality of planetary gears, journalled in a planet carrier about the sun gear. The planetary gears, while walking about the sun gear, walk the output hub at an increased rate of rotation over that of the planet carrier. The sun gear is rotated directly and acts as the input drive member. At the lowest ratio (one-to-one), the sun gear drives the planetary gear carrier and the output hub. Movement of a set of nested eccentrics varies the relationship of the planetary gears sequentially while the sun gear causes the planetary gears to rotate about the fixed eccentric assembly, thereby imparting an additional speed factor to the transmission output hub.

What is claimed is:

1. A continuously variable transmission comprising:
   an input drive means including an input shaft having a sun gear rotatable therewith,
   an output speed control assembly operatively connected to said input drive means,
   a power output means including a plurality of planet gears spaced about and meshing with said sun gear, said power output means being operatively connected to said speed control assembly,
   said output speed control assembly including an eccentric means movable in continuous increments from a first position of concentricity between said power input and power output means wherein the ratio of output to input speed is one to one to a plurality of selectable positions of eccentricity wherein the ratio of output to input speed is progressively greater than one to one as said selected positions of eccentricity are progressively increased,
   each said planet gear being mounted on a planet gear shaft through an overrolling clutch assembly which permits each said planet gear to freely rotate about its respective shaft in one direction and precludes rotation about shaft in the opposite direction, and
   means for maintaining the angular velocity of each planet gear relatively constant throughout its arc of rotation about said eccentric means when said planet gear is in a drive mode to preclude imparting a pulsed drive.

2. A continuously variable transmission as defined in claim 1 wherein said means for maintaining the angular velocity of each planet gear relatively constant throughout its arc of rotation about said eccentric means include a cam follower member on each said planet gear shaft operatively engaged on a surface of said eccentric means, said cam follower member being configured and shaped to provide a relatively constant rate of rotation to its respective planet gear shaft throughout the driving phase of its respective planet gear.

3. A continuously variable transmission as defined in claim 1 including means to absorb any ripple or shock imparted to said input drive means.

4. A continuously variable transmission as defined in claim 3 wherein said means to absorb any ripple or shock imparted to said input drive means includes a flexible coupling interposed between an external power input means and said input drive means.

5. A continuously variable transmission as defined in claim 1 including means interposed between each planet gear shaft and its respective means for maintaining the angular velocity of each planet gear relatively constant throughout its arc of rotation about said eccentric means for isolating the shock of clutching and de-clutching said overrolling clutches.

6. A continuously variable transmission as defined in claim 5 wherein said means for isolating the shock of clutching and de-clutching includes a flexible coupling mounted between each planet gear shaft and said eccentric means.

7. A continuously variable transmission as defined in claim 1 wherein said power output means includes an internal hub gear member in mesh with each said planet gear whereby rotation of said planet gears rotates said internal hub gear member.

8. A continuously variable transmission as defined in claim 1 wherein the ratio of output to input speed may be increased up to a ratio of at least four to one at a maximum position of eccentricity.

9. A continuously variable transmission as defined in claim 2 wherein movement of said eccentric means from its said first position of eccentricity to any position of eccentricity changes the geometric relationship between the cam follower members of each said planet gear so that as said sun gear rotates selective ones of said planet gears in progressive sequence are moved by its respective cam follower to rotate in discrete arcs of rotation with respect to said sun gear and thereby to multiply the input speed imparted to said power output means by a factor corresponding to the degree of movement imparted to said cam followers.

10. A continuously variable transmission as defined in claim 9 wherein said eccentric means includes an inner eccentric member, an outer eccentric member, a needle bearing journalled about said outer eccentric and an outer eccentric ring journalled on said needle bearing, said inner eccentric including a cylindrical segment journalled within said outer eccentric member wherein rotation of said inner eccentric member causes rotation of said outer eccentric member and outer eccentric ring from a first position wherein said axis of said inner eccentric member is coaxial with the axis of said outer eccentric member to a plurality of positions wherein said axes are progressively displaced from each other.

11. A continuously variable transmission as defined in claim 10 wherein each said cam follower is biased into contact with said outer eccentric ring.

* * * * *